US008103671B2

(12) United States Patent
Gupta et al.

(10) Patent No.: US 8,103,671 B2
(45) Date of Patent: Jan. 24, 2012

(54) TEXT CATEGORIZATION WITH KNOWLEDGE TRANSFER FROM HETEROGENEOUS DATASETS

(75) Inventors: Rakesh Gupta, Mountain View, CA (US); Lev Ratinov, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 613 days.

(21) Appl. No.: 12/249,809

(22) Filed: Oct. 10, 2008

(65) Prior Publication Data

US 2009/0171956 A1 Jul. 2, 2009

Related U.S. Application Data (60) Provisional application No. 60/979,231, filed on Oct. 11, 2007, provisional application No. 60/985,579, filed on Nov. 5, 2007, provisional application No. 61/025,647, filed on Feb. 1, 2008.

(51) Int. Cl.
*G06F 7/00* (2006.01)
*G06F 17/30* (2006.01)

(52) U.S. Cl. ........................................ 707/737; 707/769
(58) Field of Classification Search ........................ None
See application file for complete search history.

(56) References Cited

U.S. PATENT DOCUMENTS

| 4,501,012 A | 2/1985 | Kishi et al. |
| 4,591,983 A | 5/1986 | Bennett et al. |
| 4,593,403 A | 6/1986 | Kishi et al. |
| 5,214,707 A | 5/1993 | Fujimoto et al. |
| 5,384,892 A | 1/1995 | Strong |
| 5,418,943 A | 5/1995 | Borgida et al. |
| 5,574,828 A | 11/1996 | Hayward et al. |
| 5,613,036 A | 3/1997 | Strong |
| 5,852,804 A | 12/1998 | Sako et al. |
| 5,978,784 A | 11/1999 | Fagg et al. |
| 6,148,298 A | 11/2000 | LaStrange et al. |
| 6,236,994 B1 | 5/2001 | Swartz et al. |
| 6,308,178 B1 | 10/2001 | Chang et al. |
| 6,385,535 B2 | 5/2002 | Ohishi et al. |
| 6,665,644 B1 | 12/2003 | Kanevsky et al. |

(Continued)

FOREIGN PATENT DOCUMENTS

EP     1 408 303 A1    4/2004

(Continued)

OTHER PUBLICATIONS

PCT International Search Report and Written Opinion, PCT/US2008/079651, Dec. 12, 2008, 9 pages.

(Continued)

*Primary Examiner* — Uyen Le
(74) *Attorney, Agent, or Firm* — Fenwick & West LLP; Mark E. Duell (57) ABSTRACT

The present invention provides a method for incorporating features from heterogeneous auxiliary datasets into input text data for use in classification. Heterogeneous auxiliary datasets, such as labeled datasets and unlabeled datasets, are accessed after receiving input text data. Features are extracted from each of the heterogeneous auxiliary datasets. The features are combined with the input text data to generate a set of features which may potentially be used to classify the input text data. Classification features are then extracted from the set of features and used to classify the input text data. In one embodiment, the classification features are extracted by calculating a mutual information value associated with each feature in the set of features and identifying features having a mutual information value exceeding a threshold value.

24 Claims, 4 Drawing Sheets

U.S. PATENT DOCUMENTS

| | | |
|---|---|---|
| 6,732,077 B1 | 5/2004 | Gilbert et al. |
| 6,778,963 B2 | 8/2004 | Yamamoto et al. |
| 7,099,854 B2 | 8/2006 | Liongosari |
| 7,113,956 B1 | 9/2006 | Elias et al. |
| 7,184,957 B2 | 2/2007 | Brookes et al. |
| 7,292,978 B2 | 11/2007 | Endo et al. |
| 7,366,705 B2 * | 4/2008 | Zeng et al. ............ 706/20 |
| 2004/0143440 A1 | 7/2004 | Prasad et al. |
| 2005/0049852 A1 * | 3/2005 | Chao .................... 704/9 |
| 2005/0080632 A1 | 4/2005 | Endo et al. |
| 2005/0149496 A1 | 7/2005 | Mukherjee et al. |
| 2005/0171948 A1 | 8/2005 | Knight |
| 2007/0005368 A1 | 1/2007 | Chutorash et al. |
| 2007/0033218 A1 * | 2/2007 | Taylor .................. 707/102 |
| 2007/0043708 A1 | 2/2007 | Tundstall-Pedoe |

FOREIGN PATENT DOCUMENTS

| | | |
|---|---|---|
| EP | 1 884 421 B1 | 10/2008 |
| WO | WO 02/73331 | 9/2002 |
| WO | WO 2007/101151 | 9/2007 |

OTHER PUBLICATIONS

Lieberman, H., "Usable AI Requires Commonsense Knowledge" Massachusetts Institute of Technology, 2008, 4 Pages.

Piotrowski, E., "How Ford Sync Works" How Stuff Works, Inc., Last updated on Oct. 30, 2008, [online] [Retrieved on Nov. 9, 2009] Retrieved from the internet <URL:http://auto.howstuffworks.com/ford-sync.htm>.

* cited by examiner

United States Patent US 8,103,671 B2

TEXT CATEGORIZATION WITH KNOWLEDGE TRANSFER FROM HETEROGENEOUS DATASETS

RELATED APPLICATIONS

This application claims priority, under 35 U.S.C. §119(e), from U.S. provisional application No. 60/979,231, filed on Oct. 11, 2007, U.S. provisional application No. 60/985,579, filed on Nov. 5, 2007, and U.S. provisional application No. 61/025,647, filed on Feb. 1, 2008, which are incorporated by reference herein in their entirety.

FIELD OF THE INVENTION

This invention relates generally to data classification, and more particularly to a system and method for using information from multiple data sources to classify data.

BACKGROUND OF THE INVENTION

Multi-category data classification is commonly performed by humans. For example, a customer service operator classifies a customer question into one of many categories supported by an expert when assigning the customer question to an expert. Generally, the information included in the customer question is insufficient to identify the relevant category, so the customer service operator is required to draw from the customer service operator's background knowledge to correctly classify the customer question. For example, classifying the question "My focus is not starting," requires background knowledge that the term "focus" refers to a type of car. Hence, to accurately classify certain questions or other data, knowledge from external sources is sometimes needed to account for deficiencies in the information provided by the question or other data.

External knowledge used to classify data can be obtained from various sources having many forms, such as structured datasets, unstructured datasets, labeled datasets or unlabeled datasets. An example of a labeled dataset is the "YAHOO® ANSWERS" online data repository, which includes question and answer pairs organized by categories and sub-categories. Another example of an external data set is "WIKIPEDIA," which includes multiple articles organized by titles, and loosely organized by category. As the number or external knowledge sources, or "auxiliary datasets," has increased exponentially, research in fields such as semi-supervised learning, multi-task learning, transfer learning and domain adaptation has also increased to better identify methods for utilizing the growing number of auxiliary datasets.

Conventionally, a "bag of words" approach has been used to incorporate knowledge from auxiliary datasets into data classification; however, this approach does not incorporate knowledge from the external datasets other than mere additional words into classification. Hence, this "bag of words" approach often incorrectly classifies words having multiple meanings spanning different categories. Other conventional methods for incorporating data from auxiliary datasets into classification are also limited because different auxiliary datasets have different properties. These different properties prevent application of conventional methods of knowledge transfer, such as transfer learning, multi-task learning or self-taught learning, to multiple types of auxiliary data sets. Thus, conventional knowledge transfer methods merely allow data from a single auxiliary dataset to be incorporated into data classification, limiting the amount of external data capable of being used during classification.

Thus, what is needed is a system and method for incorporating knowledge from multiple heterogeneous auxiliary datasets into classification of input data.

SUMMARY OF THE INVENTION

The present invention provides a method for incorporating features from heterogeneous auxiliary datasets into input text data to be classified. After receiving input text data, a plurality of heterogeneous auxiliary datasets are accessed and a plurality of features are extracted from each of the plurality of heterogeneous auxiliary datasets. In one embodiment, a subset of the heterogeneous auxiliary datasets are labeled datasets and a second subset of the heterogeneous auxiliary datasets are unlabeled datasets. The plurality of features are combined with the input text data to generate a set of features. Classification features are then extracted from the set of features and used to classify the input text data. In one embodiment, the classification features are extracted by calculating a mutual information value associated with each feature in the set of features and identifying features having a mutual information value exceeding a threshold value.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 1:
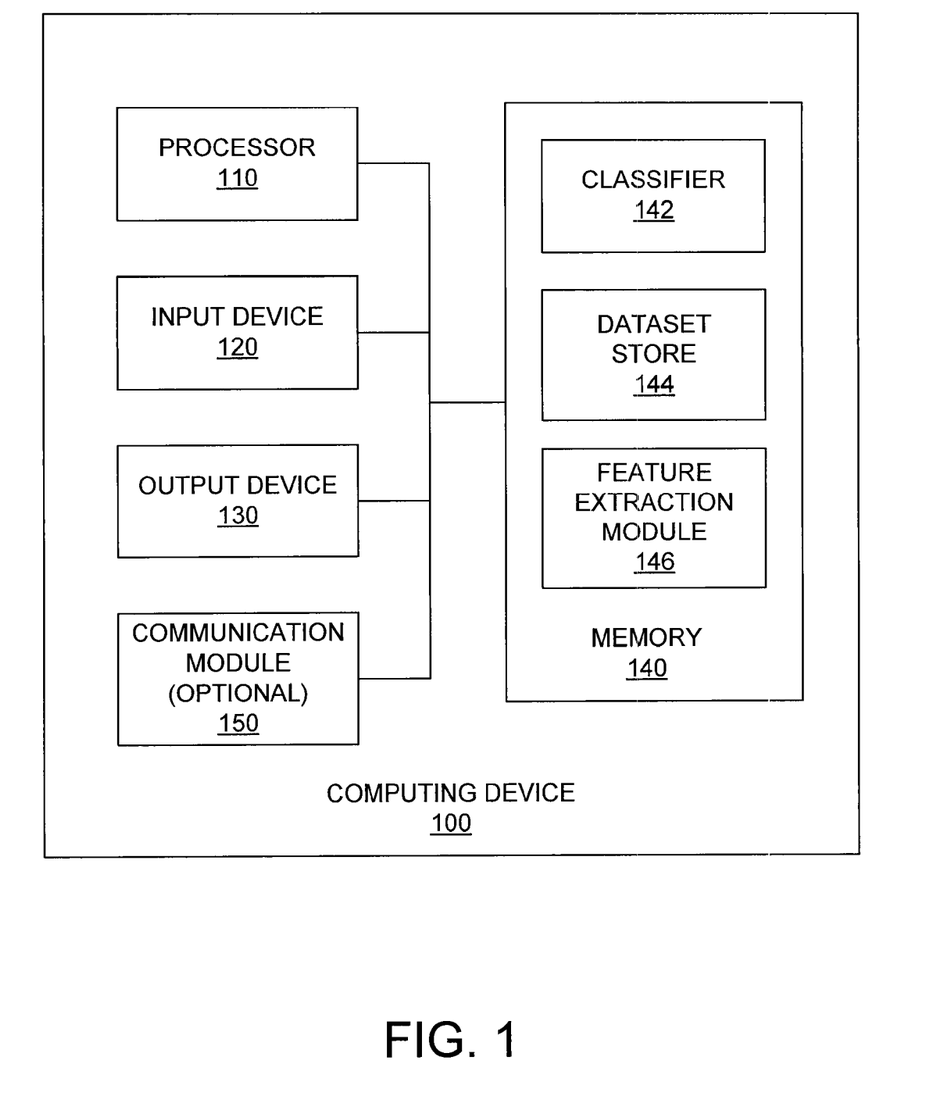
FIG. 1 is an illustration of a computing device in which one embodiment of the present invention operates.

FIG. 1 is an illustration of a computing device 100 in which one embodiment of the present invention may operate. The computing device 100 comprises a processor 110, an input device 120, an output device 130 and a memory 140. In an embodiment, the computing device 100 further comprises a communication module 150 including transceivers or connectors.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 140, the input device 120, the output device 130 or the communication module 150.

The input device 120 is any device configured to provide user input to the computing device 100, such as a cursor controller or a keyboard. In one embodiment, the input device 120 can include an alphanumeric input device, such as a QWERTY keyboard, a key pad or representations of such created on a touch screen, adapted to communicate information and/or command selections to processor 110 or memory 140. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output device 120 is equipped with a touch screen in which a touch-sensitive, transparent panel covers the screen of output device 130.

The memory 140 stores instructions and/or data that may be executed by processor 110. The instructions and/or data may comprise code for performing any and/or all of the techniques described herein. Memory 140 may be a dynamic random access memory (DRAM) device, a static random access memory (SRAM) device, Flash RAM or other non-volatile storage device, combinations of the above, or some other memory device known in the art. The memory 140 comprises a classifier 142, a dataset store 144 and a feature extraction module 146, and is adapted to communicate with the processor 110, the input device 120, the output device 130 and/or the communication module 150.

The classifier 142 provides information for associating data with a category. Hence, the classifier 142 receives input text data and associates the input text data with a category. In an embodiment, the classifier is a Support Vector Machine (SVM) using a linear kernel, such the SVM described in "Support Vector Learning for Interdependent and Structured Output Spaces," by I. Tsochantaridis et al., International Conference on Machine Learning 2004 (ICML-2004) and "On the Algorithmic Implementation of Multiclass Kernel-Based Vector Machines," by K. Crammer and Y. Singer in Journal of Machine Learning, vol. 2, pages 265-292, which are incorporated by reference herein in their entirety. In other embodiments, the classifier 143 includes instructions for using existing data having one or more categories, such as a training corpus, to associated received data with a category described by the existing data.

The dataset store 144 includes text data describing one or more concepts organized into a plurality of datasets. In an embodiment, the dataset store 144 includes text data having different formats, such as labeled datasets and unlabeled datasets. Labeled datasets organize data, such as question and answer pairs, into one or more categories and/or sub-categories based on title, content or other characteristics of the data. Examples of labeled datasets include "YAHOO® Answers," the "Open Directory Project," Wikipedia or other collections of data partitioned into one or more categories. Unlabeled datasets include data describing one or more concepts that is not grouped or organized into categories. In one embodiment, the contents of the dataset store 144 have been modified to remove certain types of data, such as images, advanced scientific topics or other specialized data, such as names of people, names of places or difficult to describe concepts. By removing certain types of data allows the dataset store 144 to maximally to include data describing various common situations or scenarios. As the dataset store 144 includes a plurality of datasets, a primary dataset may be used to perform classification of received data, while one or more additional datasets, the "auxiliary datasets," are used to augment features of the received data, making classification of the received data using the primary dataset more accurate. The auxiliary datasets increase the amount of information associated with the received data, allowing the classifier 142 to more accurately identify or interpret portions, such as terms, of the received data. Including both labeled and unlabeled datasets in the dataset store 144 increases the amount of information about different topics or subjects to be used by the classifier 142 to classify the received data, improving the accuracy of the resulting classification.

The feature extraction module 146 includes data describing generation of features from auxiliary datasets and determining the relevancy of different features to classification. In an embodiment, the feature extraction module 146 includes data describing how to train a classifier, such as classifier 142, using an auxiliary dataset and then associate the classifier predictions into data samples associated with the input data as features of the input data. A method for using classifier predictions as features of input data is further described below in conjunction with FIG. 3. For example, the feature extraction module 146 includes instructions for performing explicit semantic analysis as described by E. Gabrilovich in "Computing Semantic Relatedness Using Wikipedia-Based Explicit Semantic Analysis" in International Joint Conferences on Artificial Intelligence (IJCAI-07) pages 1606-1612, which is incorporated by reference herein in its entirety. In an embodiment, the feature extraction module 146 also includes data describing one or more methods for extracting data from one or more unlabeled datasets using cluster based feature generation. Hence, the feature extraction module 146 allows use of information from multiple datasets when classifying input data, supplementing the input data with additional, and related, information from the auxiliary datasets which improves improving the likelihood of classifying the input text in the correct category.

In an embodiment, the computing device 100 further comprises a communication module 150 which links the computing device 100 to a network (not shown), or to other computing devices 100. The network may comprise a local area network (LAN), a wide area network (WAN) (e.g. the Internet), and/or any other interconnected data path across which multiple devices man communicate. In one embodiment, the communication module 150 is a conventional connection, such as USB, IEEE 1394 or Ethernet, to other computing devices 100 for distribution of files and information. In another embodiment, the communication module 150 is a conventional type of transceiver, such as for infrared communication, IEEE 802.11a/b/g/n (or WiFi) communication, Bluetooth™ communication, 3G communication, IEEE 802.16 (or WiMax) communication, or radio frequency communication.

It should be apparent to one skilled in the art that computing device 100 may include more or less components than those shown in FIG. 1 without departing from the spirit and scope of the present invention. For example, computing device 100 may include additional memory, such as, for example, a first or second level cache, or one or more application specific integrated circuits (ASICs). Similarly, computing device 100 may include additional input or output devices. In some embodiments of the present invention one or more of the components (110, 120, 130, 140, 142, 144, 146) can be positioned in close proximity to each other while in other embodiments these components can be positioned in geographically distant locations. For example the units in memory 140 can be programs capable of being executed by one or more processors 110 located in separate computing devices 100.

Figure 2:
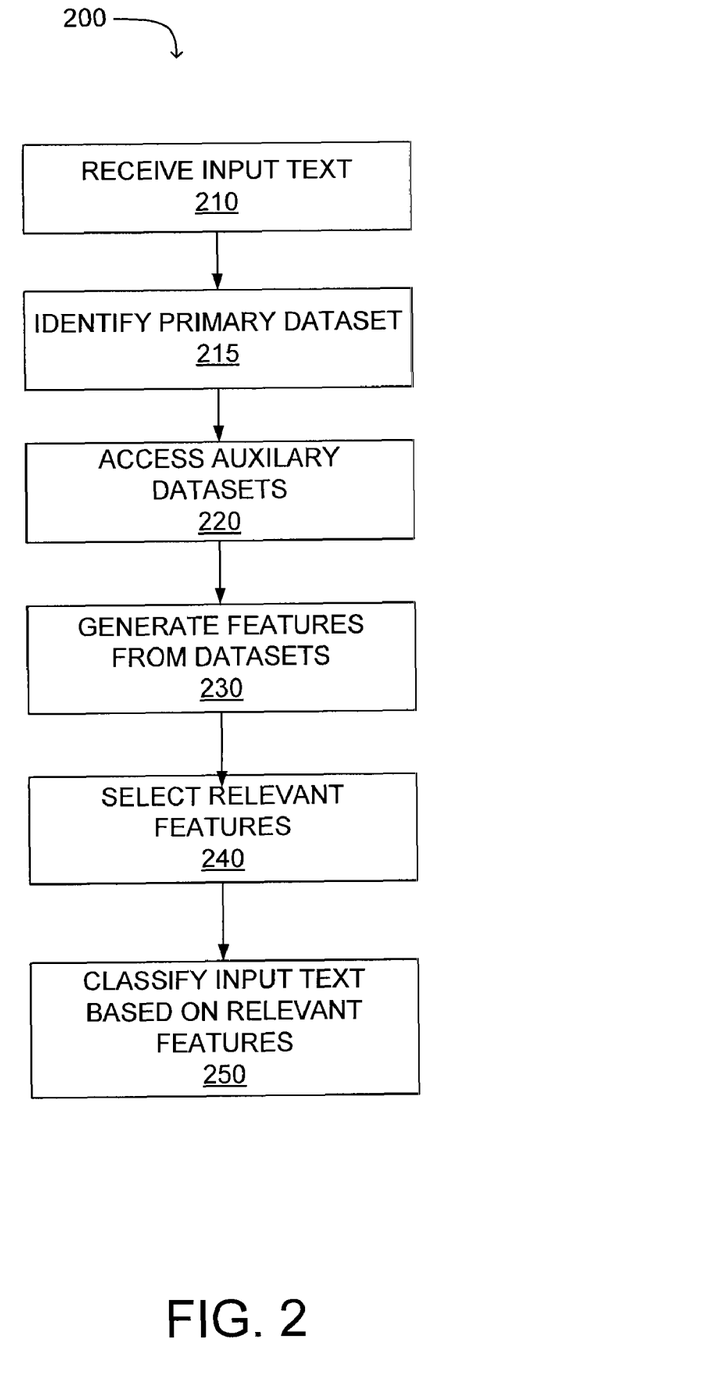
FIG. 2 is a flowchart illustrating a method for classifying input data using knowledge from heterogeneous datasets according to one embodiment of the present invention.

FIG. 2 is a flowchart illustrating a method 200 for classifying input data using additional knowledge from a plurality of heterogeneous datasets to classify data according to one embodiment of the present invention. In an embodiment, the steps of the method 200 are implemented by the microprocessor 110 executing software or firmware instructions that cause the described actions. Those of skill in the art will recognize that one or more of the methods may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 2 in different orders. Moreover, other embodiments can include different and/or additional steps than the ones described here.

Initially, input text data is received 210 from the input device 120 or the communication module 150. For example, the input text data comprises one or more short text snippets, such as "I drive a HONDA®," which describe a situation or scenario. In one embodiment, the input text data is processed to remove stop words or to remove text strings having less than ten words. This initial processing maximizes increases the amount of information that can be classified in the input text data by removing words, such as stop words, that are not likely to include data and by removing small text strings which include minimal information for use in classification. A primary dataset is then identified 215 from the dataset store 144. In one embodiment, the primary dataset comprises a labeled dataset which includes text data partitioned into multiple categories organized by topic or content. For example, the primary dataset comprises a corpus of question-answer pairs organized according by topic, such as "YAHOO® Answers" or "GOOGLE® Answers," or a corpus of transcribed conversational speech that is grouped into a plurality of categories based on the content of the speech.

A plurality of auxiliary datasets are accessed 220 in addition to the primary dataset. The plurality of auxiliary datasets allow the content of the input text to be augmented with additional background information from the auxiliary datasets, improving classification accuracy by providing context, or additional detail, associated with terms included in the input text. The auxiliary datasets are one or more unlabeled datasets, one or more labeled datasets or a combination of labeled datasets and unlabeled datasets. One or more features are then generated 230 from each auxiliary dataset. The features allow information to be extracted from the auxiliary datasets and transferred from the auxiliary dataset to the input text data, increasing the amount and type of information included in the input text data for classification. Hence, the primary dataset and the auxiliary datasets are used to generate 230 a set of features describing the content of the input text. Generation 230 of features from auxiliary datasets is further described below in conjunction with FIG. 3.

To improve classifier 142 efficiency and avoid over-fitting, the set of features from the auxiliary datasets is evaluated so that the most relevant features are selected 240. In one embodiment, relevant features are selected 240 by determining a mutual information score between different features and the input text data as further described below in conjunction with FIG. 4. For example, features having a mutual information score equal to or exceeding a threshold value are selected 240 or a set of features having the highest mutual information scores are selected 240. After the relevant features from the auxiliary datasets are identified and used to augment the input text data, the classifier 142 identifies the category most relevant to the input text data using the selected features and classifies 250 the input text data in most relevant category. In one embodiment, a support vector machine (SVM) with linear kernels is used to classify 250 the input text data after augmentation with the selected features.

Hence, the features from the auxiliary datasets allow incorporation of additional data, such as background information, into the input text data to improve classification 250 of the input text data. The additional information from the auxiliary datasets allows the classifier 142 to more accurately interpret terms in the input text or to more accurately identify the topic of the input text, much like how humans use prior experiences to determine the definition words when used in different contexts. Additionally, using information from auxiliary datasets for classification 250 allows more accurate classification of input text having a small number, such as five or ten, words by using the auxiliary datasets to identify the meaning of each word in view of the possible context of the input text data.

Figure 3:
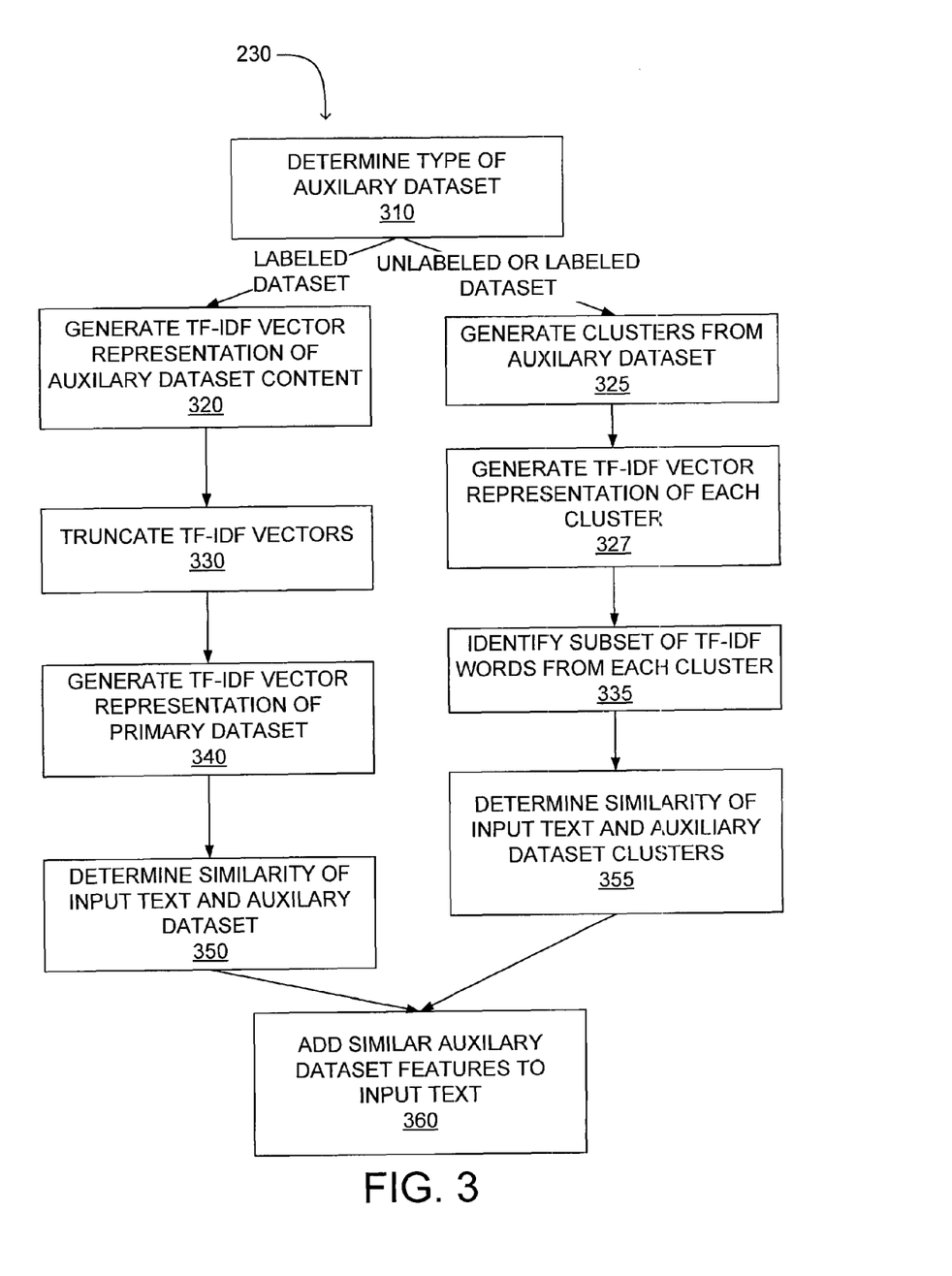
FIG. 3 is a flowchart illustrating a method for extracting features from auxiliary datasets according to one embodiment of the present invention.

FIG. 3 is a flowchart illustrating a method for generating 230 features from a plurality of auxiliary datasets according to one embodiment of the present invention. In one embodiment, the dataset store 144 includes a plurality of different types of datasets, such as unlabeled datasets, labeled datasets or a combination of labeled datasets and unlabeled datasets. As different types of datasets are included in the dataset store 144, the type of auxiliary dataset is initially determined 310. Because conventional approaches for knowledge transfer are ill-suited for application to multiple datasets having different properties, initially determining 310 the type of dataset allows selection of a knowledge transfer method most suitable for the characteristics of the dataset. In the example shown in FIG. 3, it is determined 310 whether a dataset is a labeled dataset, which includes text data that is organized into one or more categories based on the subject, topic or content of the text data, or an unlabeled dataset, which includes unorganized text data describing multiple subjects or topics.

Responsive to determining 310 the auxiliary dataset is a labeled dataset, a vector representation of the content of the auxiliary dataset is generated 320. In one embodiment, term frequency-inverse document frequency (TF-IDF) vectors are generated 320 for each category in the labeled auxiliary dataset. For example, if the auxiliary dataset comprises labeled data organized into three categories for "Restaurants," "Bars," and "Car Rentals," the content of each category is used to generate 320 TF-IDF vectors for each category. Hence, in the example described above, a TF-IDF vector is generated 320 describing words included in the "Restaurants" category and separate TF-IDF vectors are generated 320 to describe words included in each of the "Bars" and "Car Rentals" categories. By using TF-IDF vectors, the generated vector representation indicates the importance of each word in the vector representation to the category. As the primary dataset is previously known, the vector generation 320 is limited to words which appear in the primary dataset, reducing the number of words in the vector representation of the auxiliary dataset.

To further limit the size of the vector representation of each auxiliary dataset category and increase the likelihood that the vector representation accurately describes each auxiliary dataset category, the centroid of each TF-IDF vector is used as the vector representation of each category. However, the vector representation of the auxiliary dataset may include extraneous or incorrectly classified words, so the vector representation of each category in the auxiliary dataset is subsequently truncated 330 to include a predetermined number of words. In one embodiment, the TF-IDF vector representation of each category is organized by a TF-IDF value associated with each word in the vector representation so the TF-IDF vector indicates the importance of each word to the corresponding category. For example, the first ten words in the vector representation are the ten words most relevant to the document being analyzed so the ten words most accurately represent the content of the category represented by the vector representation. Hence, in one embodiment the predetermined number of words selected from the vector space to truncate 330 the vector representation of the auxiliary dataset content most accurately represent the topics or categories included in the labeled dataset.

A vector representation, such as a TF-IDF representation, of each document in the primary dataset is generated 340 to limit the number of features from the auxiliary dataset to those features relevant to the identified primary dataset based on the content of each document in the primary dataset. For each truncated vector representation of an auxiliary dataset category, the similarity between the truncated vector representation of the auxiliary dataset category and is the input text data is determined 350. In one embodiment, the similarity between input text data and truncated vector representations of the auxiliary dataset is determined 350 by computing the cosine similarity of the input text data and the truncated vector representation of the auxiliary dataset category. If the cosine similarity of the input text data and the vector representation of the auxiliary dataset category exceeds a specified threshold, the corresponding auxiliary dataset category is added 360 to the input text data as a feature. Hence, information from one or more categories in the auxiliary dataset similar to the input text data is added as additional features to the input text data, augmenting the input text data with additional information allowing the classifier 142 to better interpret the context and meaning of terms in the input text data.

Responsive to determining 310 that the auxiliary dataset is an unlabeled dataset, clusters are generated 325 from the auxiliary dataset to reduce the number of generated features, allowing real-time performance and efficient use of memory resources. In one embodiment, a prescribed number of clusters are generated 325 using unsupervised agglomerative clustering, such as the clustering method performed by the CLUTO clustering software. For example, (K)(N) clusters are generated, where N is the number of categories in the primary dataset and N is a constant value, such as 50. A vector representation of each generated cluster is then generated 327. In one embodiment, term frequency-inverse document frequency (TF-IDF) vectors are generated 327 for each cluster of the auxiliary dataset. A subset of the vectors, such as the 20 words having the highest TF-IDF score, are then identified 335 from the vector representation of each cluster. Hence, in one embodiment a predetermined number of words are selected from the vector representation of each cluster, forming a subset of words representative of each cluster.

For each subset of words from a cluster in the auxiliary dataset, the similarity between each cluster of the auxiliary dataset and the input text data is determined 355. In one embodiment, similarity between input text data and auxiliary dataset is determined 355 by computing the cosine similarity of the vector representation of the primary dataset document and the vector representation of the auxiliary dataset cluster. If the cosine similarity of the vector representation of an auxiliary dataset cluster and the input text data exceeds a specified threshold, the corresponding auxiliary dataset cluster is added 360 to the document from the primary dataset as a feature. Hence, information from the auxiliary dataset is added to the input text data to provide additional information to allow the classifier 142 to more accurately interpret terms in the input text data.

Although FIG. 3 illustrates use of cluster-based feature generation to extract features from an unlabeled dataset, in other embodiments, methods such as principal component analysis, described in "Using Linear Algebra for Intelligent Information Retrieval" by M. Berry, S. T. Dumais and G. W. O'Brien, SIAM Review 37(4):573-595, incorporated by reference herein in its entirety, or sparse coding, described in "Self-Taught Learning Transfer Learning from Unlabeled Data" by R. Raina et al., ICML-2007, incorporated by reference herein in its entirety, may be used to extract high-level features from unlabeled datasets.

Figure 4:
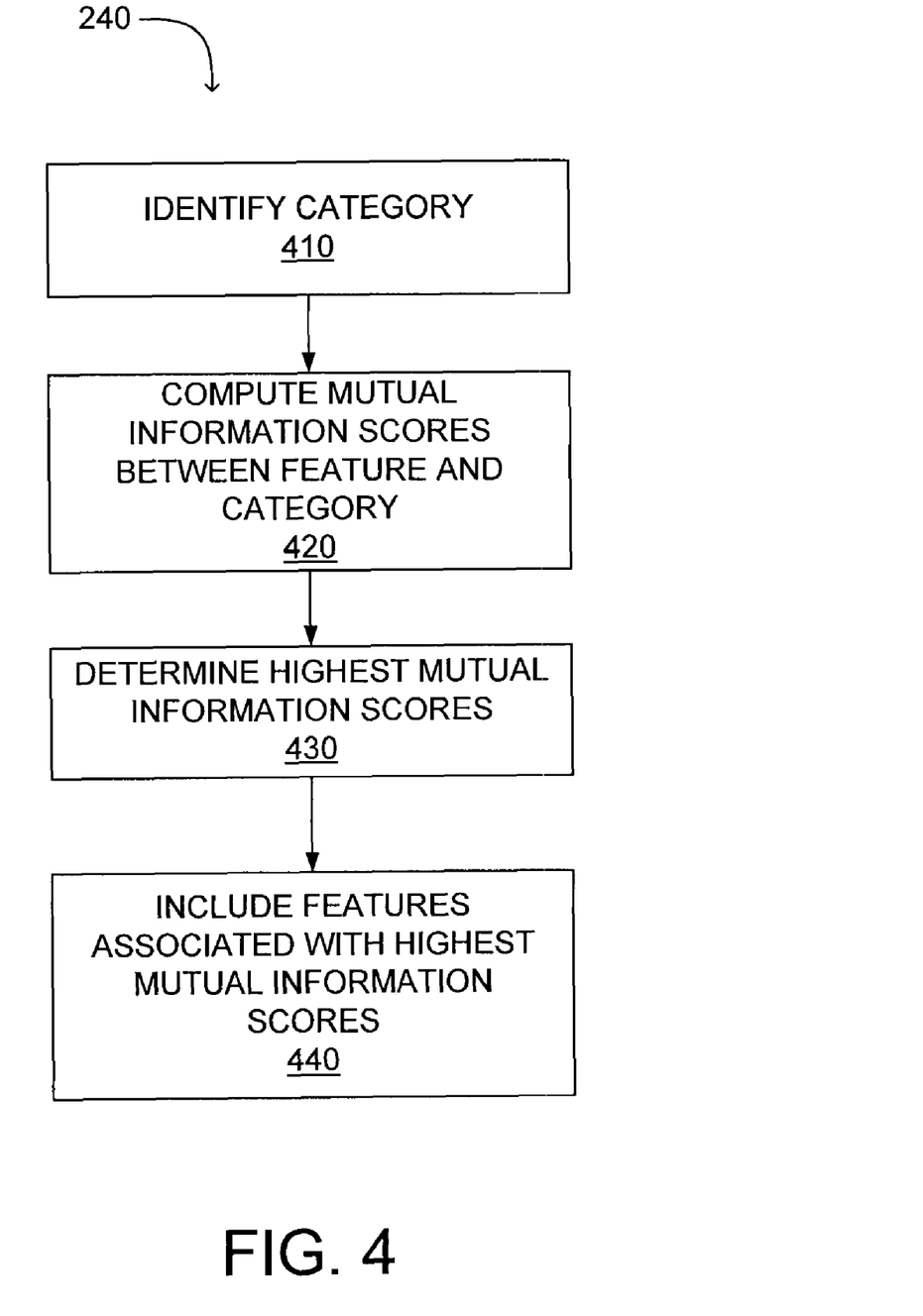
FIG. 4 is a flowchart illustrating a method for identifying relevant features from auxiliary datasets according to one embodiment of the present invention.

FIG. 4 is a flowchart of a method for selecting 240 relevant features from auxiliary datasets according to one embodiment of the present invention. To improve classification efficiency and avoid over-fitting, the number of features generated from the auxiliary datasets is reduced to those features most from a category or cluster most relevant to classifying the input text data. Features from the auxiliary datasets are analyzed with respect to various categories to determine how the features contribute to classification of input text data in various categories.

Initially, a category of data is identified 410 from the input text data. The expected mutual information score of each potential feature from an auxiliary dataset or datasets and the identified category is then computed 420. The mutual information score describes how much information the presence or absence of the feature contributes to correctly classifying input text data as a member of the identified category. In one embodiment, the mutual information score is calculated according to:

$$MI(f; c) = \sum P(F, C) \log \frac{P(F, C)}{P(F)P(C)}$$

Where:
F is binary random variable having a value of 1 if the feature is included in the current sample of data and the value zero if the feature is not included in the current sample of data, and C is a binary random variable having a value of 1 if the current sample of data belongs to the identified category and having a value of zero otherwise.

In one embodiment, the probabilities associated with the F and C variables in the mutual information score described above are calculated using maximum likelihood calculations. After computing 420 the mutual information scores for each potential feature and the identified category, the potential features having the highest mutual information scores are determined 430 and are then included 440 as features of the input text data to aid in classification.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-implemented method for classifying input text data by obtaining information from multiple datasets, the method comprising the steps of:
   receiving, at a computer, the input text data;
   accessing, at the computer, a plurality of heterogeneous datasets, the plurality of heterogeneous datasets each including text data;
   generating, at the computer, a set of features from the plurality of heterogeneous datasets, the set of features including one or more features from each of the plurality of heterogeneous datasets;
   selecting, at the computer, one or more classification features from the set of features; and
   generating, at the computer, an augmented input text data by combining the input text data and the one or more classification features; and
   applying, at the computer, a classifier to the augmented input text data to associate the input text data with a category.

2. The computer-implemented method of claim 1, wherein the plurality of heterogeneous datasets comprises a labeled dataset and an unlabeled dataset.

3. The computer-implemented method of claim 1, wherein generating the set of features from the plurality of heterogeneous datasets comprises:
   determining whether a dataset is a labeled dataset or an unlabeled dataset;
   responsive to determining the dataset is a labeled dataset, generating a vector representation of a category of the dataset;
   generating a reduced vector representation by truncating the vector representation of the category of the dataset;
   determining a similarity value between the reduced vector representation and the input text data; and
   responsive to the similarity value exceeding a threshold value, including the reduced vector representation in the set of features.

4. The computer-implemented method of claim 3, wherein the vector representation of the category of the dataset comprises a term-frequency-inverse document frequency vector.

5. The computer-implemented method of claim 3, wherein generating the reduced vector representation comprises:
   selecting a centroid of the vector representation of the category of the dataset; and
   truncating the centroid of the vector representation of the category of the dataset to a predefined number of words.

6. The computer-implemented method of claim 3, wherein determining the similarity value between the reduced vector representation and the input text data comprises:
   computing a cosine similarity between the reduced vector representation and the input text data.

7. The computer-implemented method of claim 1, wherein generating the set of features from the plurality of heterogeneous datasets comprises:
   determining whether a dataset is a labeled dataset or an unlabeled dataset;
   responsive to determining the dataset is an unlabeled dataset, generating a plurality of clusters from the dataset;
   generating a vector representation of a cluster;
   generating a subset of the vector representation of the cluster;
   determining a similarity value between the subset of the vector representation and the input text data; and
   responsive to the similarity value exceeding a threshold value, including the reduced vector representation in the set of features.

8. The computer-implemented method of claim 7, wherein generating the plurality of clusters from the dataset comprises:
   generating a defined number of clusters using unsupervised agglomerative clustering.

9. The computer-implemented method of claim 7, wherein the vector representation of the cluster comprises a term-frequency-inverse document frequency vector.

10. The computer-implemented method of claim 7, wherein generating the subset of the vector representation of the cluster comprises:
   selecting a predetermined number of words from the vector representation of the cluster.

11. The computer-implemented method of claim 7, wherein determining the similarity value between the subset of the vector representation and the input text data comprises:
   computing a cosine similarity between the subset of the vector representation and the input text data.

12. The computer-implemented method of claim 1, wherein selecting one or more classification features from the set of features comprises:
   determining a mutual information score associated with a feature from the set of features and the input text data; and
   responsive to the mutual information score exceeding a threshold, including the feature in the set of features.

13. A computer program product, comprising a computer readable storage medium storing computer executable code for classifying input text data by obtaining information from multiple datasets, the computer executable code when executed by a processor causing a computer to perform the steps of:
   receiving the input text data;
   accessing a plurality of heterogeneous datasets, the plurality of heterogeneous datasets each including text data;
   generating a set of features from the plurality of heterogeneous datasets, the set of features including one or more features from each of the plurality of heterogeneous datasets;
   selecting one or more classification features from the set of features;
   generating an augmented input text data by combining the input text data and the one or more classification features; and
   applying a classifier to the augmented input text data to associate the input text data with a category.

14. The computer program product of claim 13, wherein the plurality of heterogeneous datasets comprises a labeled dataset and an unlabeled dataset.

15. The computer program product of claim 13, wherein generating the set of features from the plurality of heterogeneous datasets comprises:
   determining whether a dataset is a labeled dataset or an unlabeled dataset;
   responsive to determining the dataset is a labeled dataset, generating a vector representation of a category of the dataset;
   generating a reduced vector representation by truncating the vector representation of the category of the dataset;
   determining a similarity value between the reduced vector representation and the input text data; and
   responsive to the similarity value exceeding a threshold value, including the reduced vector representation in the set of features.

16. The computer program product of claim 15, wherein the vector representation of the category of the dataset comprises a term-frequency-inverse document frequency vector.

17. The computer program product of claim 15, wherein generating the reduced vector representation comprises:
   selecting a centroid of the vector representation of the category of the dataset; and
   truncating the centroid of the vector representation of the category of the dataset to a predefined number of words.

18. The computer program product of claim 15, wherein determining the similarity value between the reduced vector representation and the input text data comprises:
   computing a cosine similarity between the reduced vector representation and the input text data.

19. The computer program product of claim 13, wherein generating the set of features from the plurality of heterogeneous datasets comprises:
   determining whether a dataset is a labeled dataset or an unlabeled dataset;
   responsive to determining the dataset is an unlabeled dataset, generating a plurality of clusters from the dataset;
   generating a vector representation of a cluster;
   generating a subset of the vector representation of the cluster;
   determining a similarity value between the subset of the vector representation and the input text data; and
   responsive to the similarity value exceeding a threshold value, including the reduced vector representation in the set of features.

20. The computer program product of claim 19, wherein generating the plurality of clusters from the dataset comprises:
   generating a defined number of clusters using unsupervised agglomerative clustering.

21. The computer program product of claim 19, wherein the vector representation of the cluster comprises a term-frequency-inverse document frequency vector.

22. The computer program product of claim 19, wherein generating the subset of the vector representation of the cluster comprises:
   selecting a predetermined number of words from the vector representation of the cluster.

23. The computer program product of claim 19, wherein determining the similarity value between the subset of the vector representation and the input text data comprises:
   computing a cosine similarity between the subset of the vector representation and the input text data.

24. The computer program product of claim 13, wherein selecting one or more classification features from the set of features comprises:
    determining a mutual information score associated with a feature from the set of features and the input text data; and
    responsive to the mutual information score exceeding a threshold, including the feature in the set of features.

* * * * *